United States Patent [19]
Heck

[11] 3,855,302

[45] Dec. 17, 1974

[54] INTRODUCTION OF ORGANIC GROUPS INTO ETHYLENICALLY UNSATURATED ALDEHYDES OR KETONES USING A GROUP VIII METAL SALT

[75] Inventor: Richard F. Heck, Wilmington, Del.

[73] Assignee: Hercules Incorporated, Wilmington, Del.

[22] Filed: May 4, 1972

[21] Appl. No.: 250,461

Related U.S. Application Data

[60] Continuation of Ser. No. 883,287, Dec. 8, 1969, abandoned, which is a division of Ser. No. 479,665, Aug. 13, 1965, Pat. No. 3,527,794.

[52] U.S. Cl.................. 260/590, 260/599, 260/600
[51] Int. Cl... C07c 49/76, C07c 49/82, C07c 47/56
[58] Field of Search......... 260/590, 601 R, 599, 600

[56] References Cited
UNITED STATES PATENTS

| | | | |
|---|---|---|---|
| 3,413,352 | 11/1968 | Heck | 260/590 |
| 3,527,794 | 9/1970 | Heck | 260/476 C |
| 3,294,830 | 12/1966 | Horvitz et al. | 260/526 |
| 3,306,930 | 2/1967 | Copelin et al. | 260/604 AC |

Primary Examiner—Daniel D. Horwitz
Attorney, Agent, or Firm—John W. Whitson

[57] ABSTRACT

The process involves the introduction of an organic group into an ethylenically unsaturated aldehyde or ketone. As an example, a mixture of diphenylmercury, lithium palladium chloride and acrolein is formed in acetonitrile as solvent. This results in the formation of an unstable adduct between the acrolein and phenylpalladium chloride. Decomposition of the adduct by maintaining it above its decomposition temperature provides cinnamaldehyde as the product.

7 Claims, No Drawings

INTRODUCTION OF ORGANIC GROUPS INTO ETHYLENICALLY UNSATURATED ALDEHYDES OR KETONES USING A GROUP VIII METAL SALT

This is a continuation of application Ser. No. 883,287 filed Dec. 8, 1969 now abandoned, which in turn is a division of application Ser. No. 479,665, filed Aug. 13, 1965, now U.S. Pat. No. 3,527,794, issued Sept. 8, 1970.

This invention relates to the preparation of substituted ethylenically unsaturated organic compounds by the use of organometallic compounds as intermediates.

It is known to produce saturated organic compounds by addition of organometallic compounds to unsaturated organic compounds and subsequent removal of the metallo group. This reaction is limited in scope by the fact that it is not applicable to many organometallic compounds or to many unsaturated compounds. Moreover, this reaction is applicable mostly to highly reactive organometallic compounds which require anhydrous conditions and the absence of reactive functional groups with which side reactions often take place.

It is an object of the present invention to produce substituted olefinic compounds.

In accordance with the present invention, it has been found that a Q-substituted ethylenic compound is formed by producing an unstable organometallic compound adduct of said Q-substituted ethylenic compound and a Group VIII metal residue and decomposing said unstable adduct intermediate by maintaining said intermediate above its decomposition temperature until said decomposition is effected and that said organometallic compound adduct of said Q-substituted ethylenic compound is formed as an intermediate by contacting an ethylenic compound with an organometallic compound, in which Q is the organo group and a Group VIII metal residue is the metallic group, or by contacting a normally stable organometallic compound adduct of said Q-substituted ethylenic compound and a metal residue of certain metals of Groups II-B and IV-A with a metal salt of a Group VIII metal.

The group designations refer to the Periodic Chart of the Elements such as is published by Fisher Scientific Company and such as appears in Handbook of Chemistry and Physics, 33rd Edition, pages 342–343 (1951).

The process of this invention depends upon the reaction broadly expressed as follows:

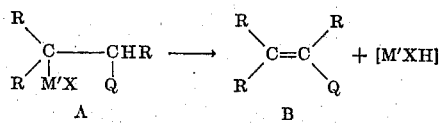

in which compound A is an unstable compound referred to above as an unstable organometallic compound adduct of a Q-substituted ethylenic compound. The compound A, in which M' is a Group VIII metal and X is an anion such as $Cl^-$, $Br^-$, $CN^-$, $NO_3^-$, $RSO_3^-$, $SO_4^{--}$, $HSO_4^-$, carboxylate anions such as benzoate$^-$, $CH_3CO_2^-$, and $CF_3CO_2^-$, $F^-$, $ClO_4^-$, $OH^-$, $OR^-$, $O^{--}$, and $BF_4^-$, is unstable and readily breaks down to compound B, the product of this invention.

The compound A is formed by the reaction of QM'X with an olefin as expressed symbolically:

(a) 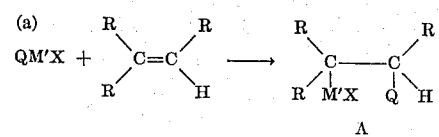

In these formulas the R groups are hydrogen or C—C bonded organic radicals, other than —$CH_2Z$, where Z is halogen, —OH or etherified or esterified —OH. The organometallic compound QM'X is the organometallic compound of the Group VIII metal of the formula shown when the valence is two, and the formula is to be understood to be $QM'X_2$ when the valence is three.

The organometallic compound QM'X for the reaction expressed by (a) is produced indirectly from another organometallic compound which is a compound of Q and another metal, M, by reaction with a salt of M'. This other organometallic compound of Q and M is a compound with a carbon-metal linkage and this organometallic compound may be in the form $Q_2M$, $Q_3M$, $Q_4M$, QMX, $QMX_2$, $OMX_3$, $Q_2MX_2$ or $Q_3MX$, depending on the metal M and its valence. Using QMX for an example, this reaction is expressed as follows:

$$QMX + M'X_2 \longrightarrow QM'X + MX_2$$

This equation expresses the reaction when both M and M' have a valence of two and corresponding equations may be written where M and M' have different valences.

The organometallic compounds which undergo the reactions of this invention include those which have more than one carbon to metal linkage, as in the case where the organo group is also an organo metallo group. More specifically, if QM'X represents an organometallic compound of this invention, where Q is the organo group, M' is a Group VIII metal and X is an anion, the Q group may be a Q'M'X group. Thus, a poly-organometallic compound of this invention includes those represented by the formula $Q(M'X)_y$ where y is the number of such groups attached to Q. The number of M'X groups per molecule will most commonly be one, occasionally two, and may be three or more, depending on the number of groups which can be attached to a single Q group. For convenience in discussion, the organometallic compounds will be referred to by the convenient formula QM'X, although it is understood that the actual valences will determine the formula in each specific case.

An organometallic compound represented by $Q(M'X)_y$ will react with y moles of ethylenic compound to effect poly-substitution of the Q nucleus as follows:

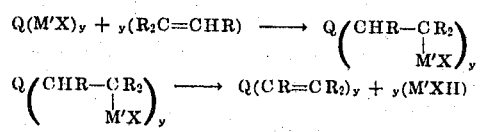

By this process, it becomes possible to introduce more than one new functional group into a single organic nucleus. Thus, a difunctional aromatic compound of a Group VIII metal such as palladium can be produced and reacted during its short life with any of a large group of ethylenic compounds to introduce two new ethylenic groups having the same R substituents as the original ethylenic compound. These organopolymetallo compounds of Group VIII metals are produced from other organopolymetallo compounds as set forth above for the organomonometallo compounds as set forth above.

Organometallic compounds of Q and a metal other than a Group VIII metal are well known in the art. In the case of the Group II-B organometallic compounds, represented by the formula QMX, these are well known for Zn, Cd and Hg. However, the organometallic compounds of Zn are highly reactive with water and with many organic functional groups which preclude their use, and, although the organometallic compounds of Cd have mild reactivity, they must be used in non-aqueous medium and are of limited value. The organometallic compounds of mercury, on the other hand, do not react with water and for this reason are the most useful organometallic compounds of the Group II-B metals for use in this invention.

Organometallic compounds of the Group IV-A metals are those of Ge, Sn and Pb. These are generally prepared from organometallic compounds of Group I-A or Group II-A metals and the Q groups are limited only by the limitations of reactivity of the organometallic compound with functional groups that may be present in the Q group. Some of these organometallic compounds are water sensitive and are limited in utility from that standpoint. The tin and lead organometallic compounds are of greatest utility of this group. The tin organometallic compounds can be in the lower or higher valence states. They are formed from organometallic compounds of Groups I-A or II-A and the tin chloride. It is convenient in some cases to produce the tin organometallics from the mercury organometallic, e.g., by reaction of the tin chloride, to form the stannic organometallic compound. Methyl and phenyl tin compounds and substituted phenyl tin compounds are quite suitable for this invention. The lead compounds are prepared similarly to the tin compounds and the organolead compounds are also readily prepared by other methods. They are less reactive with water and have advantages in this respect for use in this invention.

The organomercury compounds are the most generally useful of the various organometallic compounds discussed above because of their ease of preparation, even in aqueous solution, and because of the variety of organic Q groups which may be introduced thereby.

The various methods of preparation and the properties of organometallic compounds which are useful in this invention are discussed in great detail in "Organometallic Compounds," by G. E. Coates, Second Edition, 1960, John Wiley & Sons, Inc., N.Y.

In carrying out process (a), the organometallic compound of the Group VIII metal is produced by the reaction of a Group VIII metal salt with one of the organometallic compounds of mercury, tin or lead, and the organic Q group is transferred to the Group VIII metal. The organometallic compound of the Group VIII metal sometimes has a short life period at ordinary temperature and in such a case must be used promptly or be maintained at reduced temperatures well below room temperature of 24°C., and preferably at a temperature in the range of −20° to −80°C., until used. The usual procedure is to use the organometallic compound promptly without purification, and it can even, in most instances, be produced in situ in the presence of the olefinic compound with which it is to react.

In carrying out process (a), the adduct formed is one which may be produced by an intermediate reaction of an organometallic compound of mercury, tin or lead with the olefinic compound. When process (a) is carried out in situ, there is a possibility that in some cases this intermediate may actually form. However, it appears that this is not always the case. Moreover, such a process is useful in those combinations of olefin and organometallic compounds which will form the desired adduct.

In the in situ process, wherein the organometallic compound of mercury, tin or lead is normally reactive with functional groups in the olefin in the absence of the Group VIII metal salt, the greater reactivity with the Group VIII metal salt to form the organometallic compound of the Group VIII metal prevents, or at least greatly decreases, those undesired reactions which would take place in their absence. In this in situ process, the Group VIII metal salt is referred to hereinafter as a promoter and the Group VIII metal the promoter metal, which will be designated M'.

In accordance with the preferred process of the present invention, an ethylenically unsaturated compound of the formula

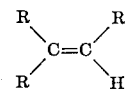

where R is an organic substituent, a non-metal inorganic substituent, or hydrogen, is contacted with (a) an organometallic compound of the formula $Q_m(MX_n)_y$, where M is a metal of the group consisting of Hg, Sn and Pb, and m and n are digits whose sum totals the valence of M, and n but not m may be zero, y is a whole number from 1–5, and X is an anion, and (b) a promoter of the group consisting of salts of a Group VIII metal of the group consisting of Pd, Pt, Rh, Ru, Ni, and Fe and an anion, and complexes of said salts, as well as non-ionizing salts such as phenoxides, acetylacetonates, etc. The product of this invention is a compound of the formula

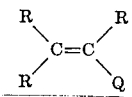

In the above formulas of the preferred process,
R is a member of the group consisting of $R^1$, $R^5$, and $R^6$;
$R^1$ is either $R^2$ or $R^3$;
$R^2$ is exemplified by such groups as —CN, —CO$_2$H, —CO$_2$ metal, —CO$_2R^5$, —CHO, —COR$^5$, —CONR$_2^4$, —C(=NR$^4$)NR$_2^4$, —NR$_2^4$, —NO$_2$ and —OR$^4$;
$R^3$ is exemplified by such groups as —Cl, —Br, —OR$^4$, —F, —I and —OCOCH$_3$;
$R^4$ is an aromatic, aliphatic, or alicyclic hydrocarbon group, which, when taken alone, is monovalent and, when taken together with another $R^4$ on the same or adjacent carbon atom forms a hydrocarbon ring including the carbon or carbons to which the $R^4$'s are attached, is bivalent;

$R^5$ is a member of the group consisting of $R^4$ and H;

$R^6$ is $R^4$ substituted by at least one $R^1$ group on any carbon except the number one carbon of $R^4$;

Q is exemplified by such groups as $CH_3-$, $-Q_m(MX_n)_y$, $Ar-$, $-Ar-$, $ArCH_2-$, $-Ar(OC(O)CH_3)CHO$, $(CH_3O)_yAr-$, $(Cl)_yAr-$, $(Br)_yAr-$, $(F)_yAr-$, $Cl(CH_3O)Ar-$, $Br(CH_3O)Ar-$, $F(CH_3O)Ar-$, $-Ar(NO_2)_y$, $-C(O)OR^4$, furyl, thienyl, $(CH_3)_2NAr-$, $CH_3C(O)NHAr-$, $(HO)_yAr-$, $R^4OAr-$, $CH_3C(O)OAr-$, $CH_3C(O)OAr(COOH)-$, $ArC(O)Ar-$, $-ArCOOH$, $-ArCHO$, $(CH_3)_yAr-$, $-Ar(OH)CHO$, $-Ar(COOR^4)$, and $Ar_yAr-$, where Ar stands for aryl and is a benzenoid ring radical such as phenyl, naphthyl, anthracenyl, phenanthrenyl, benzothienyl, fluorenyl and ring substitution products thereof, and y is a whole number from 1 to 5.

When $R^4$ is taken together with another $R^4$ on the same or an adjacent carbon or carbons to which the $R^4$'s are attached, so as to form a hydrocarbon ring, the resulting ethylenic compound is one of a large group of organic compounds which includes such cyclic unsaturated compounds as cyclohexene, camphene, alphapinene, beta-pinene, dicyclopentadiene, dihydrodicyclopentadiene, cyclopentene, benzalcyclohexane, methylidenecyclohexane, ethylidenecyclohexane, and indene. In the presence of many of these ligands, a higher temperature may be required for effecting the elimination step of the process than in the presence of others.

The preferred olefinic reactants in the process of this invention are ethylenically unsaturated hydrocarbons, aldehydes, ketones, carboxylic acids and the corresponding nitriles and esters of said acids. All of these compounds are characterized by containing at least one hydrogen atom bonded to one of the ethylenic carbon atoms at the point of ethylenic unsaturation. Including the ethylenic carbons, the total number of carbon atoms in the preferred compounds generally will be in the range from two to ten inclusive. Of course, in the case of the aldehydes, acids and nitriles, the minimum number of carbon atoms will be three, and in the case of the ketones and esters the minimum number of carbon atoms will be four. Similarly, the preferred organometallic compounds used in the process of this invention are those in which the organo group, Q, contains from one to fourteen carbon atoms inclusive and is selected from the group consisting of alkyl and aryl groups.

The reactions whereby the process of this invention may take place may be expressed using divalent M and M' as follows:

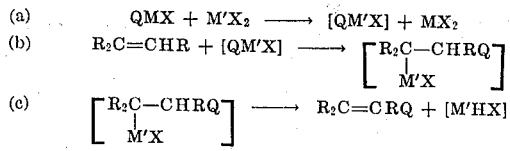

Brackets are used to indicate compounds which are considered transient or too unstable to isolate. These are more stable when a compound, which forms a coordination compound therewith, is present as is indicated hereinafter. When all R groups are hydrogen, the product is $QCH=CH_2$. When two R groups are hydrogen as in the case of propylene, the product depends on the manner in which [QM'X] adds. When Q adds to the ethylenic carbon holding the most hydrogen, $QCH=CH-CH_3$ is formed and when Q adds to the ethylenic carbon holding the least hydrogen,

is formed. In the usual case the former appears to be favored. If there is only one hydrogen on the ethylene carbons, only one type of addition can lead to the elimination reaction, and it appears from the yields found, that the favored mode of addition is that which leads to the successful elimination reaction.

While the above theory of reaction helps to explain the process involved and is useful for discussion purposes, it does not exclude the possibility of different intermediates and even the possibility of the formation of intermediates which can be isolated.

Furthermore, the mechanism set forth is not intended to give an indication of the order of combining the essential components of the reaction; for, QMX may be contacted with M'X first to form the QM'X and the resultant QM'X combined with the olefin, or the QMX may be contacted with the olefin and the resultant mixture contacted with $M'X_2$, or all three components may be contacted together simultaneously. Moreover, QMX may be formed in situ, where possible and convenient, either in the presence of both the olefin and $M'X_2$, or first in the presence of either one or the other of the olefin and $M'X_2$, then followed by addition of the other of the two.

The process of this reaction is carried out at a temperature in the range of 0°C. to about 200°C., and the reaction may be carried out stepwise, using one temperature for what might be considered one of the theoretical steps and using a different temperature for what might be considered a subsequent step. The preferred temperature range is about 15° to 150°C. Many of the reactions are conveniently carried out at 20°-50°C.

A solvent is used for convenience and the solvent used is one which does not compete with the reactions taking place and in that respect are called inert. The solvents used need not be anhydrous in those cases where the organometallic compound does not decompose in water and may be any solvent which does not react with the organometallic compound. The term "inert" as applied to the solvents used is thus variable according to the organometallic compound involved. Such solvents as methanol, ethanol, acetone, acetonitrile, ethyl acetate, volatile hydrocarbons such as benzene, toluene, pentane and cyclohexane, and ethers such as diethyl ether and dioxan are useful, and all of them are inert to the organomercury compounds.

In the process of this invention, a molar amount of both $Q_mMX_n$ and the M' salt is required for the production of one mole of Q substitution. These can be regenerated from the end products for reuse. The unstable metal salt end product readily decomposes to liberate free metal M' and this can be oxidatively reconverted to an M' salt. There are many well known methods for doing this chemically, with or without electrical energy. In the presence of acid, for example, [M'XH.MX$_2$] can be converted to 'X$_2$ + MX$_2$ at the anode. In the presence of a redox system, [M'XH.MX$_2$] can similarly be converted to M'X$_2$ + MX$_2$. If M'XH.MX$_2$ breaks down into M' + MX$_2$, this end product can likewise, by either of these methods, be converted to M'X$_2$ + MX$_2$.

From M'X$_2$ + MX$_2$ in admixture, a mixture of QMX and M'X$_2$ can be produced with varying degrees of ease, the ease of so doing being greatest when M is mercury. In many cases, QH can be reacted directly with M'X$_2$.MX$_2$ so as to obtain QM'X, which is effective for reaction with the ethylenic compound. Moreover, this formation of QM'X may be effected in situ, as will be shown hereinafter in the examples.

Since Q$_m$MX$_n$ and the M' salt can both be regenerated from the end products in situ, less than the molar amount of either may be present at the time of reaction. From the economics standpoint, this is advantageous. It is particularly desirable to be able to regenerate M' salt whether in situ or by separation of the M' end product of the reaction, regeneration outside or within the system, and reuse of M'X$_2$ salt or a complex thereof. As indicated above, both QMX and M'X$_2$ can be regenerated together in certain instances, and thus much less than molar amounts of both reagents may be utilized in the system where regeneration is practiced.

The Group VIII metal salt which is used in the process of this invention commonly forms complexes or coordination compounds with solvents which are used, and this is advantageous for solubility considerations. It is advantageous to also add inorganic salts which similarly form complexes. Lithium chloride is particularly advantageous in this respect. Organic materials which form coordination compounds and are useful include acetonitrile, di- and triphenyl phosphine, trimethyl phosphine, pyridine, piperidine, dipyridyl, phenanthrylene, triphenyl arsine, benzonitrile, dimethyl sulfoxide, bisphosphines, phosphites, aliphatic and aromatic amines, and even ethylene. When some of these substances which form coordination compounds with the Group VIII metal are present, they stabilize the QM'X compound as well as the adduct and may require a higher temperature to effect the elimination step of the process.

The following examples illustrate various ramifications of this invention, but the invention is not to be limited thereby.

EXAMPLE 1

Into a glass pressure chamber was injected 150 ml. ethylene gas at about 25°C. and 20 ml. of a 0.1 molar solution of liPdCl$_3$ in acetonitrile was added by injection. In acetonitrile, LiPdCl$_3$ appears to form rather than Li$_2$PdCl$_4$. More ethylene was injected at 24°C. to a pressure of 45 p.s.i.g. To the resulting solution was added with agitation 5 ml. of 0.4 molar solution of diphenyl-mercury in acetonitrile by injection. After agitation for 1 hour at 24°C., a sample of the acetonitrile solution was withdrawn from the system and analyzed by gas chromatography. It analyzed 0.1 molar in styrene. This calculated to be a 62.5 percent yield, based on diphenylmercury used, assuming that both phenyl groups can react. However, this would be over 100 percent, based on palladium, unless it is assumed that the palladium is prevented from being completely reduced to the metal by an oxidizing agent such as ethylene or mercuric chloride. For instance, [PdHCl], the eliminated metal compound can be oxidized to PdCl$_2$ by giving up hydrogen to ethylene or to $\phi$HgCl by the following reactions:

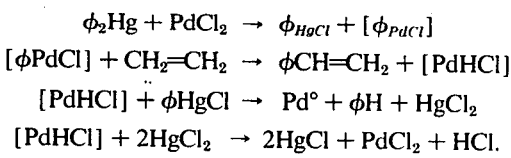

$$[\phi PdCl] + CH_2=CH_2 \rightarrow \phi CH=CH_2 + [PdHCl]$$

$$[PdHCl] + \phi HgCl \rightarrow Pd^\circ + \phi H + HgCl_2$$

$$[PdHCl] + 2HgCl_2 \rightarrow 2HgCl + PdCl_2 + HCl.$$

EXAMPLE 2

When propylene was substituted for ethylene in Example 1, the product was a solution of acetonitrile 0.075 molar in transpropenyl benzene and 0.015 molar in cis-propenyl benzene, corresponding to a yield of 56.4 percent of theory.

EXAMPLE 3

A mixture of 0.35 gram diphenylmercury, 1.68 grams acrolein, and 10 ml. of a 0.1 molar solution of LiPdCl$_3$ in acetonitrile was stirred for 16 hours at 24°C. A sample analyzed by gas chromatography showed the acetonitrile solution to be 0.1 molar in cinnamaldehyde. This corresponds to 60 percent of theoretical. The cinnamaldehyde was identified as the 2,4-dinitrophenylhydrazone, m.p. 249°–250°C. (255°C. reported in the literature).

EXAMPLE 4

A mixture of 0.35 gram diphenylmercury, 1.6 grams methyl vinyl ketone, and 20 ml. of 0.1 molar LiPdCl$_3$ in acetonitrile was stirred 16 hours at 24°C. A sample analyzed by gas chromatography showed the resulting solution to be 0.07 in benzalacetone. The benzalacetone was characterized as the 2,4-dinitrophenylhydrazone, m.p. 221.5°–222°C. (223°C. reported in the literature).

EXAMPLE 5

A mixture of 0.93 gram phenylmercuric chloride, 3 ml. 1.0 molar solution of methyl acrylate in acetonitrile and 10 ml. 0.1 molar LiPdCl$_3$ in acetonitrile was stirred 16 hours at 24°C. A sample analyzed by gas chromatography showed the resulting solution to be 0.153 molar in methyl cinnamate. This was a 100 percent of theoretical yield, based on palladium.

EXAMPLE 6

To a mixture of 32 grams anhydrous cupric chloride, 19.5 grams methyl acrylate, 62 grams phenylmercuric chloride, and 160 ml. methanol was added 20 ml. of 0.1 molar Li$_2$PdCl$_4$ in methanol with cooling so as to maintain a temperature between 24° and 40°C. After 2 hours, the reaction was complete. The solvent was removed at reduced pressure and replaced by equal parts of ether and water, and filtered to remove insoluble material. The aqueous phase was washed with five portions of ether and all ether extracts were combined with the ether phase. The ether phase, after drying, was distilled to obtain 18.5 grams methyl cinnamate, b.p. 119°–137°C./8 mm. which crystallized readily and melted at 33°C. This corresponded to 57 percent of theoretical yield. The purity was 99 percent.

EXAMPLE 7

To a mixture of 32 grams anhydrous cupric chloride, 19.5 grams methyl crotonate, 62 grams phenylmercuric chloride and 160 ml. methanol was added 20 ml. of 0.1 molar $Li_2PdCl_4$ in methanol, with cooling so as to maintain a temperature between 24°C. and 40°C. After 24 hours at 24°C., the solvent was distilled off in vacuo and methylene chloride substituted. The insoluble material was removed and the methylene chloride solution of the product was washed with water and dried. This solution was distilled to recover the product, b.p. 110°–135°C./5 mm., which weighed 10 grams. The product was fractionated by gas chromatography. The main fraction amounting to 60 percent of the product was shown by carbonhydrogen analysis and nuclear magnetic resonance spectrum to be methyl 3-phenyl-2-butenoate. The yield of this product was 24 percent of theory. It analyzed 74.53% C, 7.02% H and the n.m.r. spectrum at 60 m.c. in deuterochloroform showed: 2 singlets of relative area 3 at −142 cps., a singlet of relative area 3 at −204 cps., a narrow quartet of relative area 1 at −354 cps., and a multiplet of relative area 5 at −424 cps. with respect to tetramethylsilane as an external standard. These data indicate phenyl and carbomethoxy are cis to each other.

EXAMPLE 8

To a mixture of 32 grams anhydrous cupric chloride, 18.7 grams methyl methacrylate, 62 grams phenylmercuric chloride and 160 ml. methanol was added 20 ml. of 0.1 molar $Li_2PdCl_4$ in methanol, with cooling so as to maintain a temperature between 24°C. and 40°C. After 24 hours, the reaction was complete. The solvent was removed at reduced pressure and replaced by equal parts of pentane and water and filtered to remove insoluble material. The aqueous phase was washed with five portions of pentane and all pentane extracts were combined with the pentane phase. The pentane phase, after drying, was distilled to obtain 17 grams of product, b.p. 108°–140°C./5 mm. as a colorless liquid. This liquid was fractionated by gas chromatography and 70 percent was obtained as the major product. It crystallized from pentane at dry ice temperature as crystals, m.p. 36°–37°C. This analyzed 74.46% C, 6.91% H, and was shown by infrared to contain a carbonyl group and a C–C double bond, clearly indicating the product to be methyl 2-methyl cinnamate. The yield was about 35 percent of theory. The n.m.r. spectrum in denterochloroform solution at 60 m.c. had bands at −107 cps. (narrow doublet of relative area 3), −209 cps. (singlet of relative area 3 or 4), and at −422 cps. (singlet of relative area 5), with respect to tetramethylsilane as an external standard.

EXAMPLE 9

Into a pressure bottle was introduced 0.7 gram p-(chloromercuri)anisole and propylene gas at about 24°C., with air displacement first at atmospheric pressure and then at 50 p.s.i.g. Then 20 ml. of 0.1 molar $LiPdCl_3$ in acetonitrile was introduced while stirring. After 3 hours of agitation, a sample was analyzed by gas chromatography, which showed a 4 percent yield of cis-anethole and a 21 percent yield of trans-anethole.

EXAMPLE 10

A mixture of 0.21 gram of ruthenium trichloride, 0.31 gram phenylmercuric chloride, and 0.48 gram methyl acrylate in 9 ml. methanol was heated at 45°C. for 16 hours. Gas chromatography showed at the end of that time that the resulting mixture was 0.025 molar in methyl cinnamate. This is a yield of about 20 percent of theory.

EXAMPLE 11

A mixture of 0.26 gram of rhodium trichloride trihydrate, 0.31 gram phenylmercuric chloride, and 0.48 gram methyl acrylate in 9 ml. methanol was heated at 24°C. for 24 hours. Gas chromatography showed at the end of that time that the resulting mixture was 0.059 molar in methyl cinnamate. This is a yield of about 57 percent of theory.

EXAMPLE 12

A mixture of 0.31 gram phenylmercuric chloride, 0.22 gram ferric chloride, 0.95 gram methyl acrylate, and 8 ml. methanol was stirred for 16 hours at about 24°C. Gas chromatography showed at the end of that time that the resulting mixture was 0.0084 molar in methyl cinnamate. This is a yield of about 7.6 percent of theory.

EXAMPLE 13

A mixture of 0.21 gram diphenylmercury, 0.22 gram nickel bromide, 0.95 gram methyl acrylate and 9 ml. acetonitrile was stirred at 75°C. for 16 hours. Gas chromatography showed at the end of that time that the resulting mixture was 0.005 molar in methyl cinnamate. This is a yield of about 5 percent of theory.

EXAMPLE 14

A mixture of 4.9 grams 3,5-bis(acetoxymercuri)-salicylaldehyde, 14.3 grams methyl acrylate and 160 ml. of 0.1 molar solution of $Li_2PdCl_4$ in methanol was stirred for 16 hours at 24°C. The palladium metal powder, which precipitated, was separated and the solvent evaporated. The residue was taken up in methylene chloride to remove insoluble salts and this solvent was evaporated. The residue was then crystallized from absolute alcohol. There was obtained 0.274 gram of crystalline dimethyl salicylaldehyde-3,5-bis(3-acrylate), m.p. 193°–195°C. In chloroform solution, this compound showed an ester carbonyl absorption band at 1715 $cm^{-1}$, an aldehyde carbonyl band at 1665 $cm^{-1}$, and a double bond absorption band at 1640 $cm^{-1}$. The carbon-hydrogen analysis showed 62.04% C, 5.14% H. The n.m.r. spectrum in deuterochloroform showed bands at −235 cps. (two singlets of relative area 6), −416, −432, −488, −506 cps. (all doublets of relative area 1 each), − 517 and −524 cps. (both doublets of total relative area 2), and −648 cps. (singlet of relative area 1).

EXAMPLE 15

In a reaction flask was placed 62 grams phenylmercuric chloride, 19.1 grams of methyl acrylate, 20 grams of sodium chloride, 2.0 grams cupric chloride, 120 ml. methanol and 40 ml. of 0.1 molar $Li_2PdCl_4$ in methanol. This solution was stirred at 40°C. while passing oxygen into the solution. At 15-minute intervals, 10 ml. portions of 3 molar hydrogen chloride in methanol were added until 50 ml. total had been added, and then two more portions were added one hour apart. After standing 16 hours at 24°C., the solvent was removed in vacuo and the residue was diluted with water and extracted with pentane. The pentane solution, after washing with water and drying, yielded on evaporation 22.4 grams of product, boiling at 110°–113°C./6 mm. This product analyzed 86 percent methyl cinnamate (60 percent of theory), and 14 percent methyl 2-methoxy-3-phenylpropionate, and the two compounds were separated by gas chromatography.

EXAMPLE 16

To a mixture of 1.6 grams anhydrous cupric chloride, 2.8 grams bis-(2-naphthyl)mercury, 0.84 gram acrolein, and 8 ml. methanol was added 1 ml. of 0.1 molar $Li_2PdCl_4$ in methanol at a temperature of about 24°C. After 72 hours, the reaction was considered complete. It was diluted with methanol and filtered. The solvent was removed at reduced pressure and the residue was converted into the 2,4-dinitrophenylhydrazone, m.p. 268°–268.5°C., weighing 0.36 gram. This was 8% of theoretical yield of 3-(2-naphthyl)acrolein.

EXAMPLE 17

A mixture of 4.4 grams ferric nitrate monohydrate, 3.1 grams diphenylmercury, 0.95 gram methyl acrylate, 8 ml. methanol, and 1.0 ml. of 0.1 molar $Li_2PdCl_4$ in methanol was stirred 16 hours at 24°C. After this period, the solution was analyzed by gas chromatography. Analysis showed the product to be 0.327 molar in methyl cinnamate, which is a yield of 33 percent of theory.

EXAMPLE 18

A mixture of 1.92 grams thallium triacetate, 3.1 grams diphenylmercury, 0.95 gram methyl acrylate, 8 ml. methanol and 1.0 ml. 0.1 molar $Li_2PdCl_4$ in methanol was stirred 16 hours at 24°C. After this period, the solution was analyzed by gas chromatography. Analysis showed the product to be 0.364 molar in methyl cinnamate, which is a yield of 36 percent of theory.

EXAMPLE 19

A reaction mixture of 1.81 grams of 2-naphthylmercuric chloride, 4 grams acrylonitrile and 50 ml. 0.1 molar $Li_2PdCl_4$ in methanol solution was stirred at 24°C. for 16 hours. The methanol solution was filtered, diluted to incipient cloudiness with water and allowed to crystallize. Crystals m.p. 143.8°–144.6°C. amounting to 0.32 gram were obtained as 3-(2-naphthyl)acrylonitrile product. This amounts to 30 percent of theory. The 3-(2-naphthyl)-acrylonitrile is characterized by infrared spectrum, which shows a nitrile band at 2015 $cm^{-1}$ and a double bond absorption at 1612 $cm^{-1}$. Carbon-hydrogen analysis showed 86.9% C, 5.3% H.

EXAMPLE 20

A reaction mixture of 0.427 gram tetraphenyl tin, 0.95 gram methyl acrylate and 10 ml. 0.1 molar $Li_2PdCl_4$ in methyl alcohol was stirred at 40°C. for 3 hours. Gas chromatography showed the solution produced to be 0.094 molar in methyl cinnamate. This corresponds to a yield of 52 percent of theory.

EXAMPLE 21

A reaction mixture of 3.13 grams phenylmercuric chloride, 0.92 gram ethyl acrylate, 1.34 grams cupric chloride, 8 ml. 95 percent ethyl alcohol, and 1.0 ml. 0.01 molar $Li_2PdCl_4$ in 95 percent ethyl alcohol was stirred at 60°C. for 2 hours. Gas chromatography showed the solution produced to be 0.415 molar in ethyl cinnamate. This corresponds to a yield of 42 percent of theory.

EXAMPLE 22

A reaction mixture of 0.52 gram tetraphenyl lead, 0.95 gram methyl acrylate and 10 ml. 0.1 molar $Li_2PdCl_4$ in methyl alcohol was stirred at 24°C. for 16 hours. Gas chromatography showed the solution produced to be 0.164 molar in methyl cinnamate. This corresponds to a yield of 62% of theory.

EXAMPLE 23

In a reaction flask was placed 2.3 grams bis-2-naphthyl mercury, 0.95 gram methyl acrylate and 100 ml. of a 0.1 molar $Li_2PdCl_4$ in methanol. This solution was stirred for about 16 hours at about 24°C., filtered and then evaporated. The residue was crystallized from aqueous methanol to obtain 0.8 gram crystalline plates, m.p. 91.6°–92.2°C. This was shown by carbon-hydrogen analysis (79.14% C, 5.84% H) to be methyl 3-(2-naphtyl)acrylate. This is confirmed by infrared spectrum in chloroform where a carbonyl band at 1710 $cm^{-1}$ and a double bond at 1640 $cm^{-1}$ appeared. The yield was 35 percent of theory.

EXAMPLE 24

A mixture of 17.3 grams mesitylene, 64 grams mercuric acetate, 100 ml. methanol and 1.0 ml. 70 percent perchloric acid was refluxed for 1 hr. at 65°C. After cooling, 2 grams sodium acetate was added to reduce the acidity and the solution was cooled to about −80°C. The crystalline solids were separated, taken up in 300 ml. of chloroform. This solution was filtered and diluted with pentane to precipitate 19 grams 2,4-bis(acetoxymercuri)mesitylene, m.p. 224°–225°C., which analyzed 60.3% Hg.

A mixture of 3.26 grams of the above 2,4-bis(acetoxymercuri)mesitylene, 4.8 grams methyl acrylate and 100 ml. 0.1 molar $LiPdCl_3$ is acetonitrile was stirred 16 hours at 24°C. The reaction mixture was filtered to separate precipitated palladium and the solvent was removed under reduced pressure. The residue crystallized from methanol diluted with water as colorless plates, m.p. 129°–129.5°C., amounting to 0.2 gram. This was shown by analysis to be dimethyl mesitylene-2,4-bis(3-acrylate), the carbon-hydrogen analysis being 70.5% C, 7.27% H.

EXAMPLE 25

A mixture of 3.1 grams phenylmercuric chloride, 1.62 grams ferric chloride, 0.26 gram rhodium trichloride, 0.95 gram methyl acrylate and 9 ml. methanol was stirred 16 hours at 24°C. Gas chromatography on the resulting mixture showed it to be 0.318 molar in methyl cinnamate. This was a yield of 32 percent of theory.

EXAMPLE 26

A mixture of 0.71 gram p-chloromercuri-N,N-diethylaniline, 0.95 gram methyl acrylate and 20 ml. 0.1 molar $Li_2PdCl_4$ in methanol was stirred 16 hours at 24°C. The precipitated metal was removed and, after removing methanol, the residue was taken up in pentane from which methyl p-diethylaminocinnamate, m.p. 41.8°–42.2°C., and crystallized out at −40°C. This product was characterized by infrared as having a carbonyl group and a double bond. The carbon-hydrogen analysis showed 72.02% C, 8.62% H. The yield was 22 percent of theory.

EXAMPLE 27

A mixture of 3.2 grams mercuric acetate, 0.23 gram palladium acetate, 8 grams acetic acid, 0.935 gram diethylaniline and 0.95 gram methyl acrylate was stirred for 16 hours at 24°C. The resulting reaction mixture was filtered, freed of solvent, taken up in pentane and crystallized at −80°C to obtain 0.16 gram crude methyl p-diethylaminocinnamate, m.p. 38°–39°C. The yield was 14 percent of theory.

EXAMPLE 28

A mixture of 2 grams anisole, 7 grams acetic acid, 0.95 gram methyl acrylate, 1.6 grams mercuric acetate and 1 ml. 0.01 molar palladium acetate in acetic acid was stirred 48 hours at 24°C. Gas chromatography showed that the solution was 0.2 molar in methyl p-methoxycinnamate. This is 88 percent of theory. The product was isolated, crystallized from pentane and further characterized by its melting point of 89°–90°C., the presence of a carbonyl and a double bond as shown by infrared analysis and its carbon-hydrogen analysis, which showed 68.25% C and 6.39% H.

EXAMPLE 29

A mixture of 1.0 ml. 1.0 molar tetramethyl tin in methanol, 0.95 gram methyl acrylate and 10 ml. 0.1 molar $Li_2PdCl_4$ in methanol was stirred 16 hours at 24°C. Gas chromatography showed that the solution was 0.048 molar in methyl crotonate. This was 57 percent of theoretical.

EXAMPLE 30

A mixture of 0.25 gram methyl mercuric chloride in 1 ml. methanol, 0.95 gram methyl acrylate and 10 ml. 0.1 molar $Li_2PdCl_4$ in methanol was stirred 24 at 24°C. Gas chromatography showed that the solution was 0.013 molar in methyl crotonate. This was 16 percent of theoretical.

EXAMPLE 31

A mixture of 1.0 ml. 1.0 molar tetramethyl lead in methanol, 0.95 gram methyl acrylate and 10 ml. 0.1 molar $Li_2PdCl_4$ in methanol was stirred 24 hours at 24°C. Gas chromatography showed that the solution was 0.093 molar in methyl crotonate. This was 112 percent of theoretical, based on one methyl of tetramethyl lead for the reaction.

EXAMPLE 32

A mixture of 1.79 grams chloromercurinitrobenzene (89% m-isomer), 4.75 grams methyl acrylate and 50 ml. 0.1 molar $Li_2PdCl_4$ in methanol was stirred 3 hours at 24°C. The resulting solution was filtered and evaporated and the product was crystallized from aqueous methanol to obtain 0.259 gram of needles, m.p. 121°–122°C., of methyl m-nitrocinnamate, the m.p. of which is reported to be 123°–124°C. The yield was 25 percent of theory.

EXAMPLE 33

A mixture of 3.7 grams 2-chloromercurithiophene, 9.53 grams methyl acrylate and 100 ml. of 0.1 molar $Li_2PdCl_4$ in methanol was stirred 48 hours at 24°C. After filtering, removing solvent under reduced pressure and extracting the product with hexane, the product was crystallized from the hexane at −40°C. There was obtained 0.85 grams methyl 3-(2-thienyl)acrylate, m.p. 40°–40.2°C., the structure of which was verified by infrared, which showed bands of the carbonyl and of a double bond, and by carbonhydrogen analysis, which showed 57.25% C and 5.00% H. The yield was 36 percent of theory.

EXAMPLE 34

A mixture of 0.25 gram methylmercuric chloride, 0.91 gram styrene and 10 ml. of 0.1 molar $Li_2PdCl_4$ in methanol was stirred 16 hours at 24°C. Gas chromatography showed that the solution was 0.068 molar in trans-propenyl benzene and that the yield was 75 percent of theory.

EXAMPLE 35

A mixture of 1.0 ml. of 1 molar tetramethyl tin in methanol, 0.91 gram styrene, and 10 ml. of 0.1 molar $Li_2PdCl_4$ in methanol was stirred 16 hours at 24°C. Gas chromatography showed that the solution was 0.01 molar in allylbenzene and 0.136 molar in trans-propenylbenzene and that the yield was 95 percent of theoretical in the latter.

EXAMPLE 36

A mixture of 1.0 ml. of 1 molar tetramethyl lead in methanol, 0.91 gram styrene and 10 ml. of 0.1 molar $Li_2PdCl_4$ in methanol was stirred 24 hours at 24°C. Gas chromatography showed that the solution was 0.192 molar in trans-propenylbenzene and that the yield was 108 percent of theory, based on one methyl group of the tetramethyl lead reaction.

EXAMPLE 37

A mixture of 3.94 grams p-acetoxymercuriacetanilide, 4.8 grams methyl acrylate and 100 ml. 0.1 molar $Li_2PdCl_4$ in methanol was stirred at 24°C. for 16 hours. The reaction mixture was freed of solvent, dissolved in methylene chloride and chromatographed on alumina. The eluate was crystallized from methanol to obtain 0.095 gram yellow crystals, m.p. 193°–194°C., the infrared spectrum of which showed a carbonyl and a double bond and an NH group. The carbon-hydrogen analysis was 65.41% C, 6.2% H, corresponding to methyl p-acetamidocinnamate. The yield was 5% of theory.

EXAMPLE 38

A mixture of 3.29 grams o-chloromercuriphenol, 9.5 grams methyl acrylate and 100 ml. 0.1 molar $Li_2PdCl_4$ in methanol was stirred at 24°C. for 16 hours. The reaction mixture was freed of solvent, dissolved in hexane and crystallized from hexane to obtain 0.061 gram colorless crystals, m.p. 136°–137°C., the infrared spectrum of which showed a carbonyl and a double bond, corresponding to methyl o-hydroxycinnamate. The yield was 3.5 percent of theory.

EXAMPLE 39

A mixture of 5.5 grams mercuric oxide dissolved in 250 ml. of 60 percent (by weight) perchloric acid and 13.0 grams o-dichlorobenzene was stirred at 24°C. for 48 hours and poured into 1 liter of an aqueous 5 percent sodium chloride solution. The oily product was separated, washed with water, and dissolved in acetone from which 2.9 grams of crude 3,4-dichlorophenylmercuric chloride, m.p. 206°–207°C., separated on addition of water.

A mixture of 2.9 grams 3,4-dichlorophenylmercuric chloride, 9.5 grams methyl acrylate, and 100 ml. 0.1 molar $Li_2PdCl_4$ in methanol was stirred 16 hours at 24°C. The reaction mixture was filtered, concentrated under reduced pressure, and dissolved in hot hexane. From this hexane solution at −5°C., colorless crystals, m.p. 117°–118°C., separated, amounting to 0.68 gram. This crystalline product was shown by infrared to contain a carbonyl and a double bond. It analyzed 51.95% C, 3.82% H, and gave 3,4-dichlorocinnamic acid on saponification and this was methyl 3,4-dichlorocinnamate. Yield was 38.5 percent of theory.

EXAMPLE 40

A mixture of 5.5 grams mercuric oxide dissolved in 250 ml. of 60percent perchloric acid and 10.0 grams benzoic acid was stirred at 24°C. for 16 hours and poured into a 1 liter aqueous 5 percent sodium chloride solution. The solid product was separated, washed with water and dissolved in acetone, from which 5.9 grams of crude m-chloromercuribenzoic acid, m.p. 257°–259°C., separated on addition of water.

A mixture of 2.5 grams m-chloromercuribenzoic acid, 6.7 grams methyl acrylate and 70 ml. 0.1 molar $Li_2PdCl_4$ in methanol and stirred 2 hours at 24°C., and then for 2 hours at 80°C. in a closed vessel. The reaction mixture was filtered, concentrated under reduced pressure and dissolved in hot hexane. From this hexane solution separated colorless crystals, m.p. 79°–80°C., amounting to 0.83 gram. This crystalline product was shown by infrared to contain a carbonyl and a double bond. It analyzed 65.17% C, 5.45% H, and gave m-carboxycinnamic acid, m.p. 274.8°–275.6°C., on saponification and this was methyl m-carbomethoxycinnamate. Yield was 54 percent of theory.

EXAMPLE 41

A mixture of 5.5 grams mercuric oxide dissolved in 250 ml. of 60 percent by weight perchloric acid and 10.5 grams benzaldehyde was stirred for 3 hours at 24°C. and poured into 1 liter of 5% aqueous sodium chloride solution to obtain 6.5 grams of m-chloromercuribenzaldehyde, m.p. 189°–191°C., which was dried.

A mixture of 3.41 grams m-chloromercuribenzaldehyde, 9.5 grams methyl acrylate and 100 ml. of 0.1 molar $Li_2PdCl_4$ in methanol was stirred 16 hours at 24°C. The reaction mixture was filtered, freed of solvent, and dissolved in hot hexane and recovered as an oil by distilling off the hexane. The oil was methyl m-formylcinnamate, which was characterized by forming its 2,4-dinitrophenylhydrazone, m.p. 221°–222°C., which analyzed 55.13% C, 3.81% H, 15.13% N. The yield was 3% of theory.

EXAMPLE 42

To a mixture of 1.6 grams anhydrous cupric chloride, 3.6 grams p-chloromercuribenzoic acid, 0.95 gram methyl acrylate and 8 ml. methanol was added 1.0 ml. of 0.1 molar $Li_2PdCl_4$ in methanol at a temperature of 24°C. for 48 hours and 75°C, for 30 minutes. After the reaction was complete, the solution was filtered and the solvent was removed at reduced pressure, and the product was crystallized first from hexane and then from methanol. The yield was 0.51 gram methyl p-carbomethoxycinnamate, m.p. 125.8°–126.2°C., which analyzed 65.71% C and 5.91% H and was shown by infrared to contain a carbonyl group and a double bond. The yield was 20 percent of theory.

EXAMPLE 43

A mixture of 11 grams mercuric oxide dissolved in 500 ml. of 60 percent by weight perchloric acid and 20 grams benzophenone was stirred for 48 hours at 24°C. and poured into 2 liters of 2.5 percent aqueous sodium chloride solution to obtain 4.47 grams of crude 3-chloromercuribenzophenone, m.p. 251°–252°C., which contained some 3,3'-bis(chloromercuri)benzophenone.

A mixture of 4.18 grams of this crude chloromercuribenzophenone, 9.5 grams methyl acrylate and 100 ml. of 0.1 molar $Li_2PdCl_4$ in methanol was stirred 3 hours at 24°C. The reaction mixture was filtered, freed of solvent, chromatographed on alumina and recovered as an oil, which crystallized from methanol. The crystals, m.p. 113°–114°C., amounting to 0.95 gram, were dimethyl 3,3'-benzophenone-bis(acrylate) and the yield was 3.5 percent of theory. The oil was methyl 3benzoylphenylacrylate.

EXAMPLE 44

A mixture of 32 grams mercuric acetate, 0.0023 gram palladium nitrate, 35 grams benzene, and 3.8 grams methyl acrylate was heated in a pressure bottle in a nitrogen atmosphere at 125°C. for 4 hours. The reaction mixture was shown to be 0.71 molar in methyl cinnamate. This is 63 percent of theoretical yield. The product was dissolved in pentane, freed of insoluble matter and distilled under reduced pressure to obtain 3.9 grams methyl cinnamate, boiling at 104°–107°C./4 mm.

EXAMPLE 45

A mixture of 0.34 gram diphenyl tin dichloride, 0.95 gram methyl acrylate and 10 ml. 0.1 molar $Li_2PdCl_4$ in methanol was stirred at 24°C. for 16 hours. The reaction mixture was shown to be 0.152 molar in methyl cinnamate, which is 75 percent of theory, based on 2 moles of product from 1 mole of diphenyl tin dichloride.

EXAMPLE 46

A mixture of 10 millimoles p-acetoxymercuriacetanilide and 4.77 grams methyl acrylate was reacted with 100 ml. 0.1 molar $Li_2PdCl_4$ in methanol at 24°C. for 24 hours. From this reaction mixture was recovered a 10 percent of theoretical yield of methyl p-acetamidocinnamate, m.p. 193.0°–194.5°C.

EXAMPLE 47

A mixture of 30 millimoles p-chloromercuridiphenyl and 4.77 grams methyl acrylate was reacted in 30 ml. methanol with 30 mmoles $PdCl_2$ and 60 mmoles LiCl at 24°C. for 16 hours. A 2 percent of theoretical yield of methyl p-phenylcinnamate, m.p. 144.5°–145.5°C. was isolated. After crystallization further, the m.p. was 147°–147.5°C.

EXAMPLE 48

A mixture of 10 millimoles of 2-naphthylmercuric chloride and 3 grams allylbenzene was reacted with 110 ml. 0.1 molar $Li_2PdCl_4$ in methanol at 24°C. for 16 hours. The product was 1-or 2-(2-naphthyl)-3-phenyl-1-propene, m.p. 147.6°–148.0°C.

EXAMPLE 49

A mixture of 10 millimoles of 4-chloromercuri-2-nitroanisole and 2 grams methyl acrylate was reacted with 110 ml. 0.1 molar $Li_2PdCl_4$ in methanol at 24°C. for 16 hours. A 17 percent yield of methyl 3-nitro-4-methoxycinnamate, m.p. 130°–130.2°C., was isolated from the reaction mixture.

EXAMPLE 50

A mixture of 10 millimoles of chloromercuribenzoic acid and about 10 grams styrene was reacted with 100 ml. 0.1 molar $Li_2PdCl_4$ in methanol at 24°C. for 16 hours. From this reaction mixture was recovered a 36 percent of theoretical yield of m-carbomethoxystilbene, m.p. 159.2°–159.6°C.

EXAMPLE 51

A mixture of 10 millimoles 2-chloromercurinaphthalene and 2.71 grams styrene was reacted with 110 ml. 0.1 molar $Li_2PdCl_4$ in methanol at 24°C. for 16 hours. The reaction mixture was filtered, evaporated, and crystallized from hexane. There was obtained 1.4 grams trans-2-naphthyl-1-phenylethylene, m.p. 157°–158°C. The yield was 61 percent of theory.

EXAMPLE 52

A mixture of 10 millimoles of 2-chloromercurinaphthalene and 2.7 grams α-methyl styrene was reacted with 110 ml. 0.1 molar $Li_2PdCl_4$ in methanol at 24°C. for 16 hours. The reaction mixture was filtered, evaporated, and crystallized from hexane. There was obtained 0.85 gram 2-naphthyl-1-methyl-1-phenylethylene, m.p. 108°C. The yield was 35 percent of theory.

EXAMPLE 53

A mixture of 10 millimoles of chloromercuribenzene and 2.7 grams propenylbenzene was reacted with 110 ml. 0.1 molar $Li_2PdCl_4$ in methanol at 24°C. for 16 hours. A 21 percent yield of 1,2-diphenylpropene, m.p. 88.4°–88.8°C., was isolated from the reaction mixture.

EXAMPLE 54

A mixture of 10 millimoles of phenylmercuric chloride and 3 grams anethole was reacted with 110 ml. 0.1 molar $Li_2PdCl_4$ in methanol at 24°C. for 16 hours. A yield of about 20 percent 1-panisyl-2-phenylpropene, melting at 186°–186.4°C., was isolated from the reaction mixture.

EXAMPLE 55

A mixture of 2 grams anisole and 0.97 gram methyl acrylate was mixed with 10 millimoles mercuric nitrate and 0.1 millimole palladium nitrate in 7 ml. acetic acid at 24°C. for 24 hours. Analysis showed the production of a 28 percent yield of methyl p-methoxycinnamate.

EXAMPLE 56

A mixture of 10 millimoles anisylmercuric chloride, 110 ml. 0.1 molar $Li_2PdCl_4$ in methanol and 2.7 grams propenylbenzene was reacted at 24°C. for 16 hours. 1-Phenyl-2-anisylpropene was obtained from the reaction mixture.

EXAMPLE 57

A mixture of 1.0 ml 1.0 molar phenyltin trichloride in acetonitrile, and 10 ml. 0.1 $Li_2PdCl_4$ in methanol was placed in a 250 ml. pressure bottle and 0.85 gram methyl acrylate was added. This was stirred for 24 hours at 24°C. The resulting mixture yielded methyl cinnamate in 77 percent yield.

EXAMPLE 58

A mixture of 3.5 grams bis-triphenyl phosphine palladium dichloride (5 mmole), 1.8 grams diphenylmercury (5 mmole), 3 ml. methyl acrylate and 50 ml. acetonitrile were mixed and stirred for 16 hours at 24°C. The resulting product contained 2 mmoles methyl cinnamate, as shown by gas chromatography.

EXAMPLE 59

A mixture of 1 millimole phenyl mercuric cyanide, 10 ml. 0.1 molar $Li_2PdCl_4$ in methanol, and 0.98 gram methyl acrylate was stirred for 24 hours at 24°C. Methyl cinnamate was obtained in 85 percent of theoretical yield.

EXAMPLE 60

A mixture of 15 millimoles bis(chloromercurisalicylaldehyde), 300 ml. 0.1 molar $LiPdCl_3$ is acetonitrile, and 5 grams methyl vinyl ketone was mixed at 24°C. for 24 hours. The resulting mixture analyzed 1.3 percent 3,5-bis(1-buten-3-one) salicylaldehyde, m.p. 86°–87°C. The carbon-hydrogen analysis shown 69.34% C and 5.66% H.

EXAMPLE 61

A mixture of 0.32 gram carbomethoxymercuric acetate, 0.91 gram styrene, and 10 ml. 0.1 molar $Li_2PdCl_4$ in methanol solution was stirred at 24°C. for 72 hours. Gas chromatographic analysis showed the resulting solution to be 0.028 molar in methyl cinnamate. This is 33 percent of theoretical yield.

EXAMPLE 62

A mixture of 0.3 gram carbomethoxymercuric chloride and 10 ml. 0.1 molar $LiPdCl_3$ in acetonitrile solution was stirred with propylene under 30 p.s.i. propylene pressure at 24°C for 72 hours. Gas chromatographic analysis showed the resulting solution to be 0.016 molar in methyl crotonate. This is 16 percent of theoretical yield.

EXAMPLE 63

A mixture of 0.348 gram carboethoxymercuric acetate and 10 ml. 0.1 molar LiPdCl₃ in acetonitrile solution was stirred with ethylene under 30 p.s.i. ethylene pressure at 24°C. for 72 hours. Gas chromatographic analysis showed the resulting solution to be 0.05 molar in ethyl acrylate. This was 50 percent of theoretical yield.

EXAMPLE 64

A mixture of 0.332 gram carboethoxymercuric acetate and 10 ml. 0.1 molar Li₂PdCl₄ in ethanol solution was stirred with 0.91 gram styrene at 24°C. for 16 hours. Gas chromatographic analysis showed the resulting solution to be 0.013 molar in ethyl cinnamate. This is a yield of 13 percent of theory.

EXAMPLE 65

A mixture of 0.295 gram carbomethoxymercuric chloride and 10 ml. 0.1 molar Li₂PdCl₄ in methanol was stirred at 24°C. for 16 hours under 30 p.s.i. ethylene pressure. The reaction mixture was shown to be 0.050 molar in methyl acrylate, which is 50 percent of theory.

Examples 61 to 65 are directed to a particularly interesting carboxyalkylation process wherein the organo group is a carbalkoxy group. By reacting a carboalkoxymercury compound with an olefin in the presence of a palladium salt, a carboxylic ester group is substituted for one of the ethylenic hydrogen atoms. The carboalkoxylation process preferably uses mercury as the M metal and palladium as the M' metal. Mercuric acetate reacts readily with carbon monoxide and an aliphatic alcohol to produce the carboalkoxymercury compound which has the formula

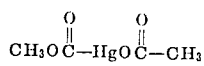

when the alcohol is methanol. Mercuric chloride does not react readily in a similar manner but the carboalkoxymercuric acetate will react with HCl to produce carboalkoxymercuric chloride and this latter compound will react with olefins in the presence of PdCl₂ in accordance with this invention.

In the carboalkoxylation of olefins in accordance with this invention, the olefins which undergo the reaction are the same as those broadly described hereinbefore and broadly include any olefin having one hydrogen on an ethylenic carbon. The olefins which undergo the reaction are ethylene and substituted ethylenes having one unsubstituted hydrogen on the ethylenic carbon. The substituting groups, i.e., the R groups of

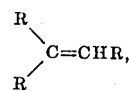

may be organic and inorganic groups of all kinds. This includes aliphatic, aromatic and alicyclic hydrocarbon groups and the halo, nitro, hydroxy, carboxy, and carboalkoxy derivatives thereof. There may be hydroxy, ester, aldehyde, ketone, carboxylic acid, halide, nitro, ether or amide groups in the substituted ethylene, and these groups may either be an R group itself or they may be substituents on an organic R group.

The carboalkoxylation process of this invention is particularly suitable for the production of acrylic esters, e.g., methyl acrylate from ethylene.

In the preferred carboalkoxylation process, the carboalkoxymercury salt, preferably the acetate, is prepared in the absence of the ethylene compound and then the palladium salt and ethylenic compound are added. The carrying out of this process in two steps is particularly desirable in the production of acrylic esters from ethylene.

The organo group, Q, of this invention includes the wide range of organo groups which are capable of forming an organometallic compound in which the organo group is joined by a carbon linkage to the metal. The term "organyl" is used as a name for the organo group when used as a prefix in chemical nomenclature and the process of introducing the organyl group into a compound is referred to as organylation. Organylation thus includes within its scope both alkylation and arylation.

The apparatus and reaction vessels used in this process may be ceramic, glass or metal lined. Metals which may be used in the lining are stainless steel, silver, copper, or other inert metals or alloys.

The term "organometallic" as used herein is restricted to compounds in which the metal in the compound is attached by a carbon-metal linkage.

The process of this invention will thus be seen to be capable of operation with varying amounts of organometallic compound and a promoter and to be operable with varying ratios of organometallic compound to promoter where is regeneration practiced. It is intended that the process covered by the appended claims shall include the situation where Q$_m$MX$_n$ is generated in situ as well as the situation where the promoter salt is regenerated and that the terms used shall be considered broadly in this respect without limitation as to the true mechanism of the reaction involved.

What I claim and desire to protect by letters patent is:

1. The process of producing a carbonyl compound of the formula

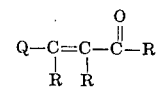

which comprises contacting and reacting an ethylenically unsaturated aldehyde or ketone of the formula

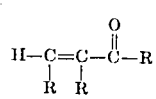

with an organometallic compound of the formula QPdX at a temperature in the range of 0°C. to about 200°C., in which formulae R is a member of the group consisting of hydrogen, methyl and monovalent aromatic hydrocarbon groups, the total number of carbons in the ethylenically unsaturated aldehyde or ketone being no more than 10, X is an anion of the group consisting of halides, cyano, nitrate, sulfates, perchlorate, fluoroborate, benzoate, acetate, trifluoroacetate and acetylacetonate, and Q is the organo group of said organometallic compound QPdX, Q in said organometallic compound being bonded to the palladium by a carbon to metal linkage and being selected from the group consisting of aryl radicals and methoxy-, chloro-, bromo-, fluoro-, nitro-, hydroxy, formyl-, benzoyl-, phenyl- and methyl-substituted aryl radicals, wherein the aryl radical is a member of the group consisting of phenyl and naphthyl.

2. The process of claim 1 in which the compound of the formula

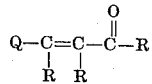

is an ethylenically unsaturated aldehyde.

3. The process of claim 2 in which the ethylenically unsaturated aldehyde is acrolein.

4. The process of claim 1 in which the compound of the formula

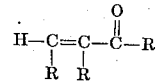

is an ethylenically unsaturated ketone.

5. The process of claim 4 in which the ethylenically unsaturated ketone is methyl vinyl ketone.

6. The process of claim 1 in which Q is phenyl.

7. The process of claim 1 in which Q is naphthyl.

* * * * *